McClure & Ellis,
Steam-Boiler Furnace,
No. 2,975. Reissued June 9, 1868.
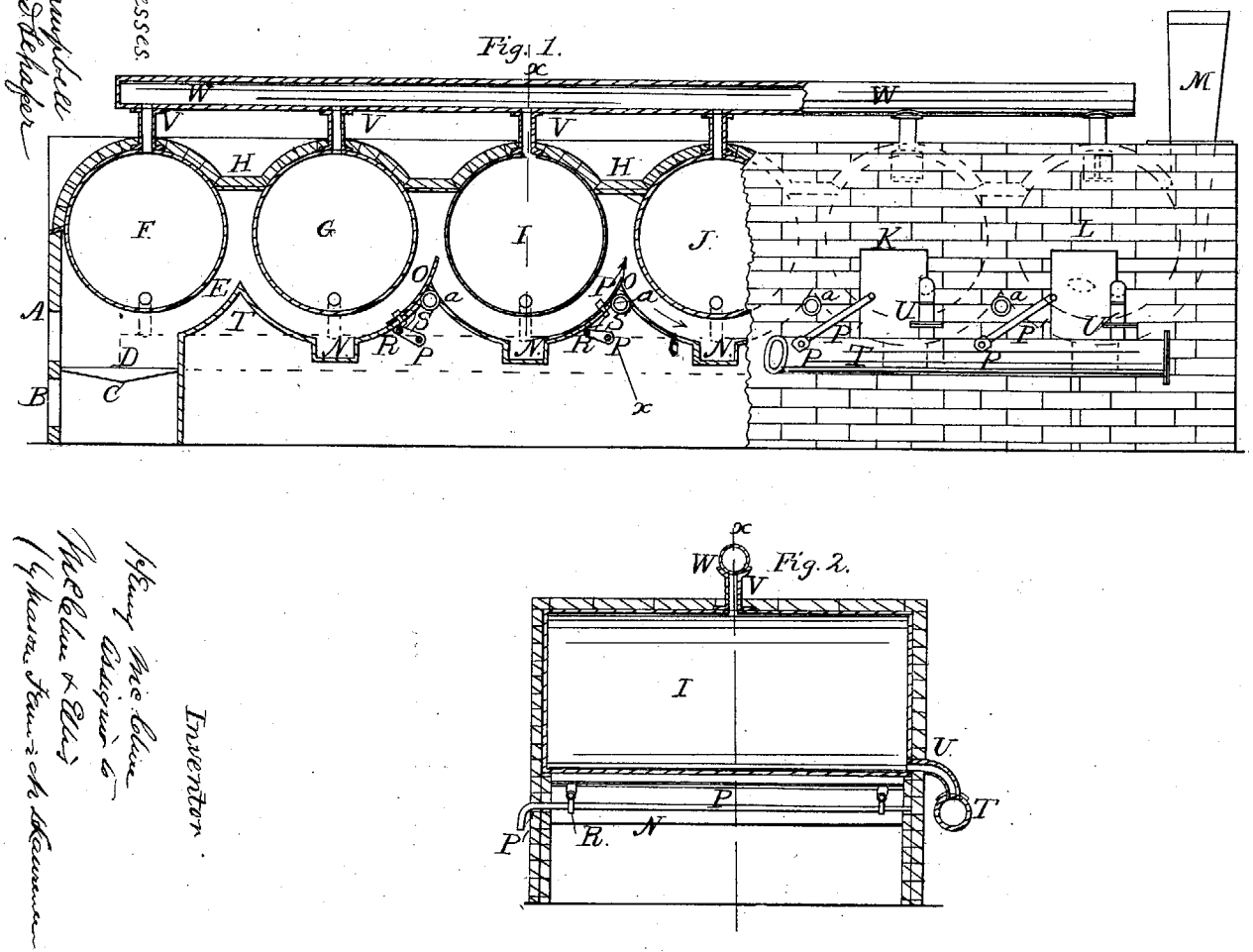
Witnesses.
R. Y. Campbell
Edward Schafer
Inventor.
Henry McClure
Assignor to
McClure & Ellis
by Mason, Fenwick & Lawrence
N. PETERS, PHOTO-LITHOGRAPHER, WASHINGTON, D. C.

United States Patent Office.

HENRY McCLURE AND JAMES ELLIS, OF TERRE HAUTE, INDIANA, ASSIGNEES OF HENRY McCLURE.

*Letters Patent No.* 58,552, *dated October* 2, 1866; *reissue No.* 2,975, *dated June* 9, 1868.

IMPROVEMENT IN STEAM-BOILER FURNACES.

The Schedule referred to in these Letters Patent and making part of the same.

TO ALL WHOM IT MAY CONCERN:

Be it known that HENRY McCLURE, of Terre Haute, in the county of Vigo, and State of Indiana, did invent certain new and useful Improvements in Furnaces and Boilers, which improvements were assigned to himself and JAMES ELLIS, of the same place, and Letter Patent for the same issued on the 2d day of October, 1866, in the joint names of HENRY McCLURE and JAMES ELLIS; now, therefore, we, the said HENRY McCLURE and JAMES ELLIS, do hereby declare that the following is a full, clear, and exact description of said improvements, reference being had to the accompanying drawings, making a part of this specification, in which—

Figure 1 is a view showing the improved furnace, partly in section.

Figure 2 is a transverse section taken in the vertical plane indicated by red line *x x* in fig. 1.

Similar letters of reference indicate corresponding parts in the two figures

This invention relates to a new and improved mode of arranging steam-generators in furnaces, and also to a mode of constructing a furnace adapted to the improved arrangement of generators, whereby the flame and heated products of combustion shall take a serpentine course through the furnace at right angles to the length of said generators, and thereby afford greater facilities than hitherto for directing and concentrating the heat about the sides and bottoms of a series of generators above any collection of sediment which may be therein, also affording facility for subjecting each one of a series of generators to a uniform heat throughout its length.

The invention further relates to a mode of constructing the flue-spaces between and beneath steam-generators which are arranged at right angles to the direction of the draught, whereby the flame and heated products of combustion are directed upward between the generators, and there mixed with currents of air, for the purpose of consuming the gaseous products, and thus saving a large amount of fuel, which would otherwise escape in the form of smoke.

The invention further relates to a mode of regulating the draught in a furnace having its generators arranged at right angles to the direction of the draught, whereby the heated currents can be more or less interrupted in their passage from the furnace to the smoke-stack, as circumstances may require, all of which will be hereinafter explained.

To enable others skilled in the art to understand this invention, we will describe its construction and operation.

In the accompanying drawings, A represents the doorway to the furnace, B the opening to the ash-pit C, and D are the grate-bars, all of which may be constructed in any suitable manner.

The bridge-wall E of the furnace is made inclined, as shown, so as to carry up the flame around the boiler F, and conduct the heat to such a height that it will strike the boiler G above any deposit of sediment that may be in this boiler, and below the water-line thereof.

The flue then curves under the boiler G with a curve somewhat similar to the curve of the outside of the boiler, and rises on the other side of the boiler to such a height that the heat and smoke will strike the next boiler, I, about the same point that it struck the boiler G. The flue then passes under all the other boilers, J K L, of the series, in the same manner, and finally passes into the stack at M. In the bottom of the lowest part of the flue, where it passes under the bottoms of the boilers, depressions or cavities N are formed, as shown in fig. 1, and at the extremities of these depressions N openings are made through the side walls of the furnace, through which ashes may be removed from the flue when necessary. The said openings should be provided with tightly-fitting doors, to prevent the influx of cool air through them during the operation of heating the boilers.

The furnace may be made smoke-consuming by admitting air into the flue at the points of highest elevation of the bottom of the said flue between the boilers, as shown at *a a*, in fig. 1. A portion of the smoke will be thus consumed as it passes from one boiler to another throughout the series of boilers. Thus it will be seen that all or nearly all of the inflammable gases will be consumed, and very little smoke will escape from the stack M.

O represent slides, which are attached to the curved rise of the flue between each pair of boilers, except the first pair nearest the furnace. These slides are for the purpose of rendering the furnace adjustable, according to the changes of the weather and other circumstances.

Each plate or slide may be operated from the outside of the furnace by means of a rock-shaft, P, one end of which extends through the furnace-wall, and is bent so as to form a crank or handle, P′, for operating it. To this shaft, arms R are rigidly attached, the free ends of which are pivoted to links or bars S. These links are again pivoted to ears or their equivalents, formed on the bottom sides of the plate or slide O, and projecting through and working in slots formed through the curved bottom of the flue, as shown in fig. 1. By this or other equivalent means the slides or plates O may be regulated at pleasure.

The mud-receiver T is connected with the boilers by goose-neck pipes U, as shown in figs. 2 and 3. This receiver is placed a little below the level of the bottoms of the boilers, and may receive the water from the supply-pipe at whatever point of said receiver may be most convenient.

The various parts of the furnace may be constructed of the materials ordinarily used for such purposes, and the boilers may be set in the usual well-known manner. The slides or plates O may be lined with fire-brick or other equivalent material, to prevent them from rapid destruction by the heat.

The boilers or steam-generators are all arranged in lines parallel to each other across the furnace, so as to lie in horizontal planes at right angles to the length of the side walls of the furnace and its flue. These boilers are also arranged parallel to the length of the fireplace, which latter is equal in length to the boilers, and equal to the width of the flue which is beneath the boilers. The boilers are also arranged so as to leave spaces between them extending up nearly to the water-line to the top of the furnace, as shown in fig. 1.

The bottom of the flue is made up of a number of inverted transverse circles, each one of which is arranged beneath its respective boiler, as shown in fig. 1, so that the heated products of combustion will be directed upwardly in the spaces between the boilers, and caused to impinge uniformly upon the side of each boiler throughout its entire length. As the products of combustion cannot ascend higher than the top wall H, they are caused to descend from each one of said spaces between the boilers, and pass beneath the boilers.

It will be seen from the above description that the products of combustion strike against the side of each one of the boilers, and then descend beneath each boiler, during which operation a very large amount of heat will be communicated to the water in the boilers, and the degree of heat received by each boiler will be uniform throughout its length.

At the ridges or highest points of the bottom of the inverted arched flue, air is introduced from the outside of the furnace-walls through conduits *a a*, which air will be directed upward, and caused to mix with the highly-heated products of combustion which circulate in the spaces between the boilers, thereby supplying oxygen, and causing more perfect combustion of the inflammable gases.

The movable plates or directors O are designed to serve as regulators for directing the heated currents, after leaving the first two boilers, more or less above the ridges of the arches, so as to strike or impinge upon the sides of the boilers at higher or lower points, as circumstances may require. Said plates also serve as dampers, for regulating the draught of the furnace to suit all changes of weather and furnaces.

Each one of the boilers communicates with a steam-drum or receiver, W, by means of a pipe, V, from which drum the steam may be taken wherever desired.

Having thus described the improved combination of boilers and furnace, and shown one practical mode of carrying the invention into effect, we do not confine ourselves to the precise form and construction of the several parts herein specified, as these may be varied according to circumstances without departing from the principle of the invention. In describing the relative arrangement of the boilers with respect to the direction of the draught through the flue, we have used the terms "transverse," and "at right angles," in contradiction to the well-known arrangement of boilers wherein the draught-flues run in line with their length. We prefer to adopt the arrangement as shown in the drawings, so as to have each boiler subjected throughout its length to a uniform heat, but do not confine ourselves to this precise relative arrangement, nor to a definite number of boilers or generators.

Having described this invention, what we claim as new, and desire to secure by Letters Patent, is—

1. The arrangement of a series of steam-boilers within a furnace, so that they shall lie transversely with respect to the direction of the draught, so that the products of combustion on their way to the chimney shall be directed against the sides and bottom of the boilers, substantially as described.

2. Transversely-arranged boilers, in combination with an inverted arched flue, arranged beneath the boilers, substantially as described.

3. The ash-troughs N, with end openings for the removal of ashes from an inverted arched flue which is beneath steam-boilers, arranged substantially as described.

4. Regulating-plates O, when applied beneath the spaces between transversely-arranged steam-boilers, substantially as described.

5. While not claiming broadly the introduction of air into furnaces for facilitating and rendering more complete combustion of inflammable gases, we do claim air-inlet pipes *a a*, applied to the ridges of the arched flue beneath spaces left between boilers, which are arranged substantially as described.

6. Transverse or cross-ducts, longitudinal draught-passage, and steam-generators, substantially as and for the purpose set forth.

HENRY McCLURE,
JAMES ELLIS.

Witnesses:
MARTIN HOLLINGER,
JOHN S. JORDAN.